(12) United States Patent
Sakata

(10) Patent No.: US 6,171,539 B1
(45) Date of Patent: Jan. 9, 2001

(54) METHOD FOR FORMING A MOLDED GROMMET

(75) Inventor: Tsutomu Sakata, Yokkaichi (JP)

(73) Assignee: Sumitomo Wiring Systems, Ltd. (JP)

(*) Notice: Under 35 U.S.C. 154(b), the term of this patent shall be extended for 0 days.

(21) Appl. No.: 09/115,753

(22) Filed: Jul. 15, 1998

(51) Int. Cl.[7] ............ B29C 69/02; B29C 45/04; B29C 45/27; B29C 45/40; B29C 53/02

(52) U.S. Cl. ............ 264/295; 264/161; 264/296; 264/318; 264/328.1; 264/328.16; 264/334; 425/438; 425/547; 425/556; 425/577; 425/DIG. 247; 249/63

(58) Field of Search ............ 264/161, 294, 264/296, 318, 328.1, 328.16, 295, 334; 425/438, 577, 556, 547, DIG. 247; 249/63

(56) References Cited

U.S. PATENT DOCUMENTS

| | | | |
|---|---|---|---|
| 3,657,407 | * 4/1972 | Gronemeyer et al. | 264/156 |
| 3,957,944 | * 5/1976 | Guala | 264/295 |
| 4,035,461 | * 7/1977 | Korth | 264/89 |
| 4,209,485 | * 6/1980 | Greenspan | 264/242 |
| 4,242,164 | * 12/1980 | Skinner | 156/304.1 |
| 4,697,861 | * 10/1987 | Mitchell | 439/271 |
| 5,989,469 | * 11/1999 | Dirr | 264/255 |

FOREIGN PATENT DOCUMENTS

| | | |
|---|---|---|
| 0121644 | 10/1984 | (EP). |
| 2039817 | 8/1980 | (GB). |
| 2191899 | 12/1987 | (GB). |
| 6165347 | 6/1994 | (JP). |

* cited by examiner

Primary Examiner—Jan H. Silbaugh
Assistant Examiner—Michael I. Poe
(74) Attorney, Agent, or Firm—Bierman, Muserlian and Lucas

(57) ABSTRACT

A method for forming a molded grommet using a device which includes a fixed mold and a movable mold, the latter having three positions. The first is a closed position, wherein the two molds are adjacent each other with a middle plate between them. Second, there is an intermediate position in which the middle plate and movable mold are spaced apart from the fixed mold. Third, there is an open position, wherein the movable mold is spaced further from the fixed mold than the middle plate. A core is fixed to the movable mold and, when in the closed position; the two molds, the core, and the edge of the middle plate define the molding space into which moldable resin is introduced, thereby forming the grommet with the edge within the channel. As the core moves from the intermediate position to the open position, the middle plate is retained in the intermediate position; therefore, the core is pulled out of the grommet through the axial hollow therein. In a preferred form of the device, a retaining element on the end of the core pulls the adjacent end of the grommet into the axial hollow. The grommet is then removed from the edge and any unwanted peripheral material is cut off. The core can be pulled out either in the direction of movement of the movable mold or an angle (preferably 90°) thereto.

2 Claims, 11 Drawing Sheets

METHOD FOR FORMING A MOLDED GROMMET

BACKGROUND OF THE INVENTION

1. Field of Invention

This invention relates to a method for molding axially hollow grommets as well as a device and mold for use therein.

2. Description of Prior Art

In the automotive industry, a grommet is used to seal a hole in a panel through which a wire harness has passed. Generally it is molded from an elastomeric material and the wire harness is passed through the grommet prior to insertion. Since the grommet is made of an elastomer, it is able to deform and fill the hole through which the wire harness passes and provide both soundproofing and waterproofing. Typically, the panel is a firewall and thus the soundproofing and waterproofing aspect is between the engine compartment and the passenger compartment.

Conventionally, grommets have been molded in a funnel design, wherein the large end has a stopping flange which interacted with the panel so as to fill the hole. The small end fits tightly around the bundle of wires in the wire harness so as to form a secure seal.

An improved design for a grommet has been suggested in Japanese Application Number 61-112732, filed Jul. 24, 1986. In this Application, the grommet, as removed from the mold, is shown in FIG. 1. Grommet 15 comprises hollow 30, body 24, long tube funnel section 31 and short tube funnel section 32. Funnel sections 31 and 32 have long tube portions and short tube portions which have been marked 33 and 34, respectively. Annular depression 35 is molded into body 24 of grommet 15. Also, reinforcement 38 is molded into end 17 of long tube portion 33.

FIGS. 2 and 3 illustrate the use of grommet 15 with wire harness W/H to fill a hole in panel P. As shown therein, the user of grommet 15 must invert long tube funnel section 31 into short tube funnel section 32 so that long tube portion 33 doubles within short tube portion 34, thus forming double walled portion 36. Wire harness W/H is then inserted through grommet 15 and tape 39 is secured around the end of double walled portion 36. Because of cavities 37, body 24 is able to deform as shown in FIGS. 2 and 3, so that grommet 15 can be easily inserted into the hole in panel P. The arrows in FIG. 2 illustrate the flexing action of the elastomeric material used to mold grommet 15. It is preferred that sealant 40 be injected around the wire harness so as to increase the waterproofing and soundproofing ability of the grommet.

one of the problems with grommet 15 is that the operator, when mounting the grommet on the wire harness, has a difficult time inverting long tube funnel section 31 into short tube funnel section 32.

It is well known to mold thermoplastic resin or rubber materials about a mandrel within the cavity of a split mold into a hollow article having an axial opening therethrough. However, there is no prior art device that could remove the object from the mandrel after molding and, at the same time, insert long tube funnel section 31 into short tube funnel section 32. It is an object of the present Invention to provide apparatus which is capable of being utilized rapidly and reliably.

SUMMARY OF THE INVENTION

Applicant has now discovered a method for forming a grommet of the type where the grommet has a body, an axial hollow therein, a peripheral channel in the body, a short tube funnel section at one end, and a long tube funnel section at the other end. The long tube funnel section is inverted into the short tube funnel section to form a double walled portion. The molding process entails the formation of a double walled portion of the grommet by using the core in the molding apparatus to reverse the long tube funnel section into the short tube funnel section.

Broadly, the grommet in accordance with the present invention comprises: a body, a long tube funnel section on one side of the body, and a short tube funnel section on the other side of the body. The molding space is defined by a core and an external multi-part mold structure, which structure has a middle plate.

The method comprises (a) molding the grommet in a closed mold so that the middle plate, which is part of the multi-part structure, is in contact with the body of the grommet when the mold is closed;

(b) opening the mold, leaving the core and the middle plate in contact with the grommet;

(c) moving the core through the grommet so that the long tube funnel section is inverted into the short tube section, thereby forming the double walled portion; and (d) releasing the grommet from contact with the middle plate and the core.

The novel mold of the present invention has L-shaped protrusions at one end of the core and corresponding depressions in the external multi-part mold structure. The method of the present Invention avoids the problem of the operator having to invert the long tube funnel section into the short tube funnel section, and the grommet can be employed as produced without further manipulation.

The device for carrying out the method comprises a fixed mold, a movable mold, and a middle plate between the two molds. The movable mold is adapted for movement among a closed position, wherein the fixed mold and the movable mold are adjacent each other with the middle plate between them; an intermediate position, wherein the movable mold and the middle plate are spaced apart from the fixed mold; and an open position, wherein the movable mold is spaced further apart from the fixed mold than the middle plate. The plane of the middle plate is preferably perpendicular to the movement of the movable mold.

There is a core affixed to the movable mold and the core, the fixed mold, and the movable mold define a molding space for the grommet when they are in the closed position. In this position, an edge of the middle plate projects into the molding space so that, when moldable material is injected into the space and solidifies, the peripheral channel is formed with the edge therein.

The core has, on its mold end remote from the middle plate, a retaining element which, when the movable mold is moved from the intermediate position to the open position, carries the adjacent neck of the grommet into the axial hollow. To effectuate this, the edge in the channel prevents the body from moving toward the open position.

In a preferred form of the device, the movable mold is mounted slidably on at least one guide pin which extends parallel to the direction of movement of the movable mold. The proximal end of the guide pin is mounted on the fixed mold and the distal end is remote therefrom. It has been found advantageous to provide two guide pins which are spaced apart in a direction perpendicular to the movement.

The guide pin also carries a stop member for the middle plate adjacent the distal end. Thus, when the movable mold moves from the intermediate position to the open position, the middle plate is retained in the intermediate position. If the moldable material so requires, a heating device can be provided adjacent the molding space to cure or otherwise set the moldable material.

The operation of the device comprises introduction of the moldable material through a sprue and a gate into the molding space while the various elements are in the closed position. This is followed by movement of the movable mold to the intermediate position, whereby the grommet is disengaged from the fixed mold. At this point, the moldable material formed by the sprue and the gate is attached to the grommet.

The movable mold is then further moved to the open position, but the middle plate remains in its intermediate position due to the stop members on the distal ends of the guide pins. The retaining element on the mold end of the core remote from the middle plate engages the adjacent end of the grommet. The edge of the middle plate being in the intermediate position, retains the body of the grommet in that position so that, as the core is withdrawn, the retaining element pulls the end of the grommet into the axial hollow. Thereafter, the grommet is removed from the middle plate and the sprue and gate are removed.

In a modification of the device, after the formation of the grommet, the movable mold moves in a first direction to an intermediate position wherein the movable mold and grommet are together spaced apart from the fixed mold. The middle plate is held in this position by stops so that, when the movable mold moves to its open position, the grommet separates therefrom.

The core is then withdrawn from the axial hollow in a second direction which is perpendicular to the first direction. The edges of the middle plate which are located in the channel restrain the grommet so that the core can be removed. In a preferred form of the Invention, there is a retainer on the mold end of the core opposite to the second direction. This engages the adjacent end of the grommet so that, as the core is withdrawn, the adjacent end is drawn into the axial hollow. The retainer is then released and the grommet removed from the middle plate. Thereafter, if necessary, any unwanted material is cut away.

BRIEF DESCRIPTION OF THE DRAWINGS

In the accompanying drawings, constituting a part hereof, and in which like reference characters indicate like parts.

FIGS. 4 to 7 illustrate the method steps in accordance with the process of the present invention;

DETAILED DESCRIPTION OF THE INVENTION

Figure 1:
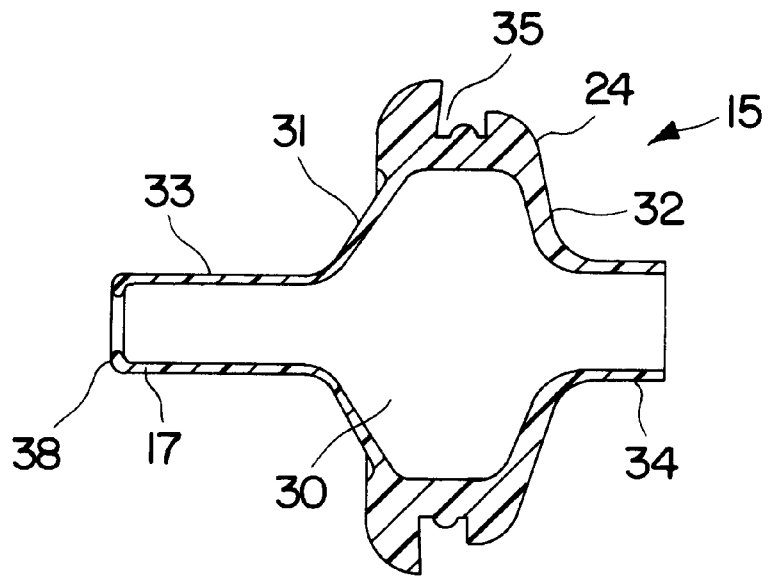
FIG. 1 illustrates a grommet molded in accordance with the prior art.
Figure 2:
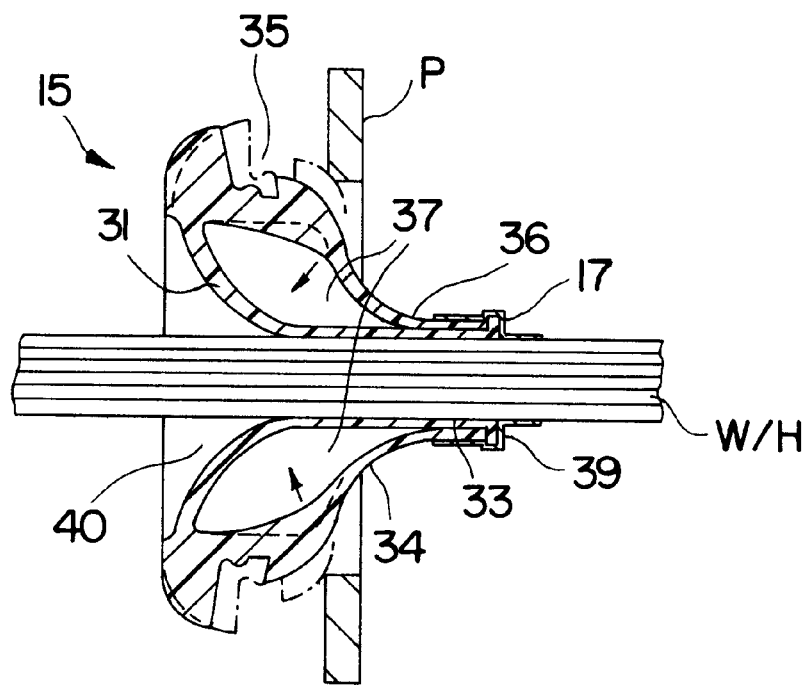
FIG. 2 illustrates the grommet of FIG. 1 with a wire harness in accordance with the prior art.
Figure 3:
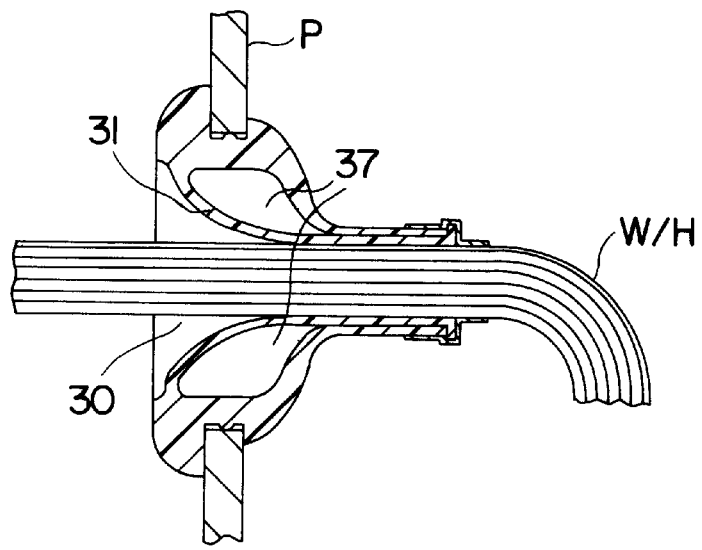
FIG. 3 illustrates the grommet with a wire harness mounted in a panel.

Referring to FIGS. 4 to 7, mold 50 is a multi-part mold having an external mold structure comprising middle plate 10 and mold sections 3 and 4. When mold 50 is closed, the external mold structure and core 16 define the molding space and grommet 15 is molded therein from elastomeric material.

Figure 4:
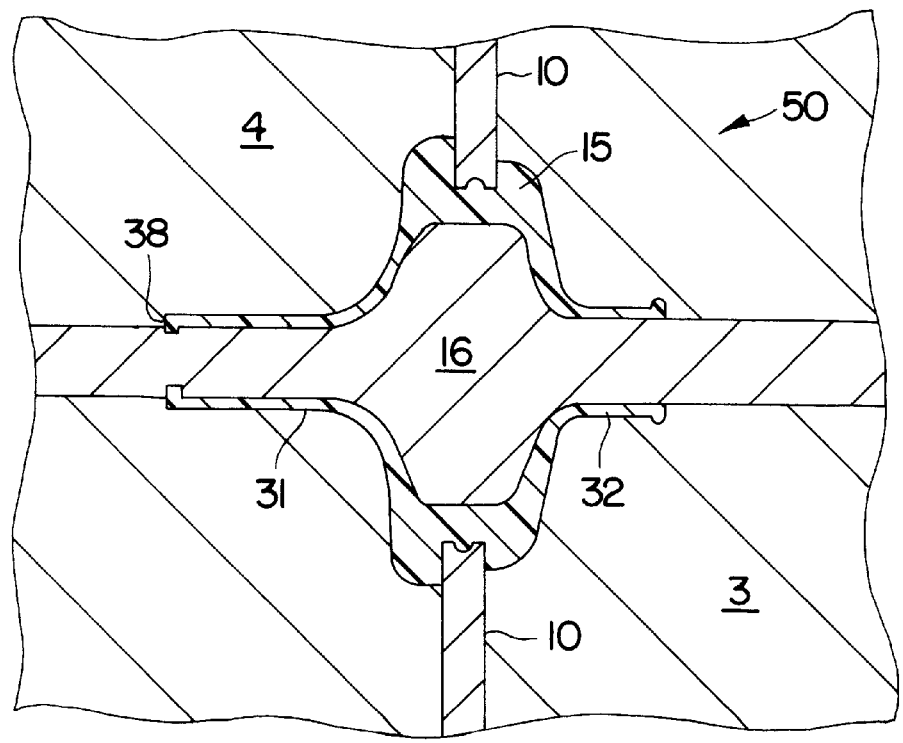
FIG. 4 illustrates a mold used for making the grommet in accordance with the method of the present invention.

Fluid elastomeric material is injected by means of a tube (not shown) and an extruder apparatus (not shown) to form grommet 15. The fluid elastomeric material is injected into the molding space and fills it as shown in FIG. 4. The material is then allowed to harden and form grommet 15 while the mold remains closed. Suitable elastomeric materials comprise rubber and synthetic rubbers, the latter including polychloroprene, butadiene-styrene copolymers, and ethylene-propylene-diene (EPDM).

Figure 5:
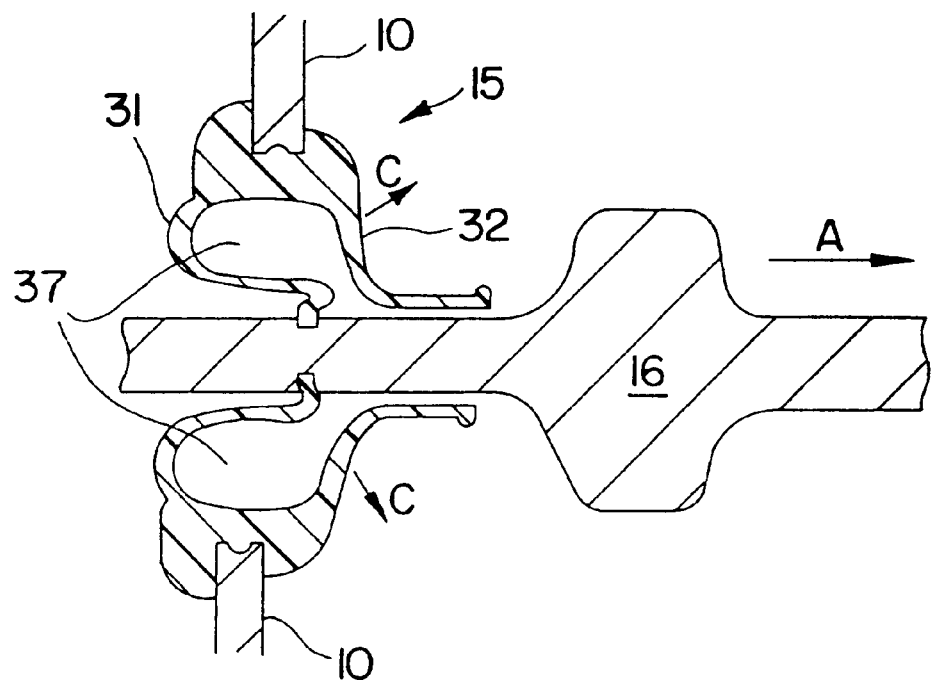
Figure 6:
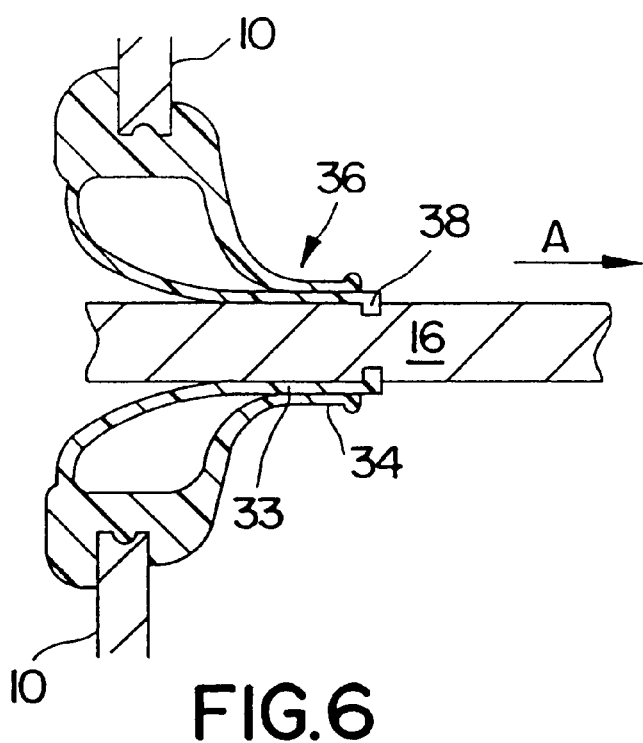
Figure 7:
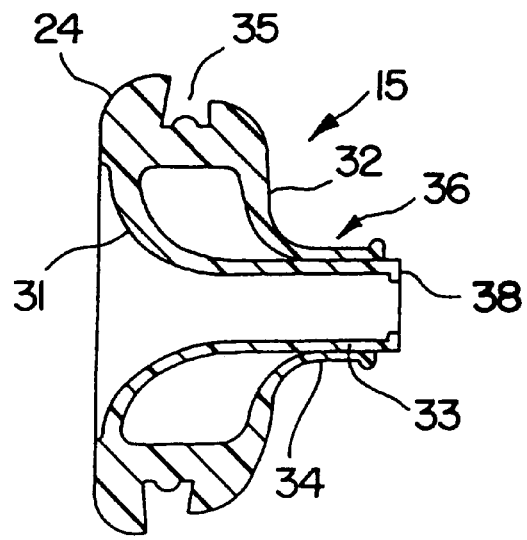

Once the fluid elastomeric material has hardened sufficiently, the mold is opened and molds 3 and 4 are separated, leaving middle plate 10 and core 16 in contact with grommet 15, as shown in FIGS. 5 and 6. Core 16 is then pulled through grommet 15 so that long tube funnel section 31 is inverted into short tube funnel section 32. Arrow A illustrates the direction of movement of the core. As will be appreciated by those of ordinary skill in the art, the elastomeric nature of grommet 15 permits short tube funnel section 32 to flex outward as shown by arrows C to allow the bulbous section of core 16 to pass through short tube funnel section 32 and exit the grommet.

In FIG. 6, core 16 has been pulled further through grommet 15 so that double walled portion 36 is formed by long tube portion 33 and short tube portion 34. At this point in the molding operation, grommet 15 is still in contact with middle plate 10 and core 16. The core is then released from reinforcement 38 which had been providing the connection between core 16 and grommet 15. This allows core 16 to be pulled completely through grommet 15 to leave grommet 15 in the configuration shown in FIG. 7. Grommet 15 is then removed from middle plate 10. In the method as shown in FIGS. 4 through 7, the long tube funnel section of the grommet has been inverted into the short tube funnel section and the fully formed grommet is now ready for use during assembly of an automobile and the insertion of the wire harness through a wall.

Figure 8:
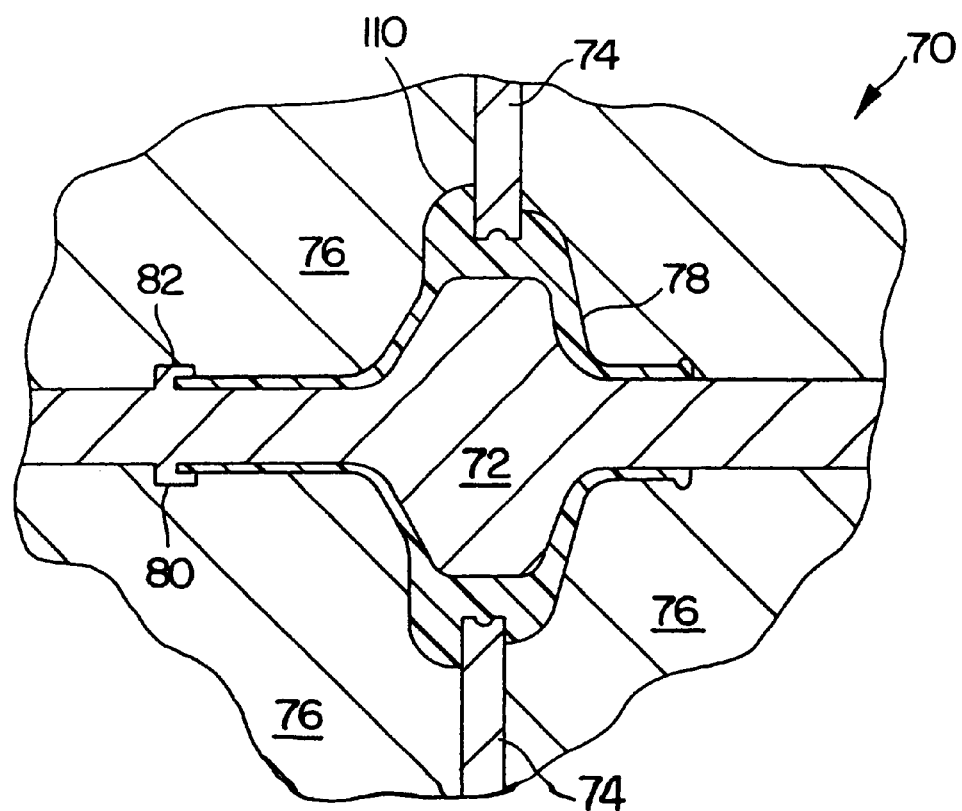
FIG. 8 illustrates a novel mold in accordance with the present invention.

FIGS. 8 through 11 show the present invention using an alternative mold design for forming the grommet. As shown in FIG. 8, mold 70 is made up of core 72, and an external mold structure which comprises middle plate 74 and mold sections 76. When mold 70 is closed, the external mold structure and core 72 define hollow 78. The difference between core 72 and core 16 is that core 72 has L-shaped protrusion 80 and mold sections 76 have complementary depressions 82 which allow the mold to be fully closed. Mold 70 is operated in a manner similar to mold 50 in that grommet 110 is formed by injection of the elastomeric material into cavity 78. Grommet 110 is essentially identical to grommet 15 except for the absence of reinforcement 38, thereby eliminating the need for depressions in core 72. In order to invert grommet 110, mold 70 is opened while leaving core 72 and central mold plate 74 in contact with grommet 110, in the same manner as for grommet 15.

Figure 9:
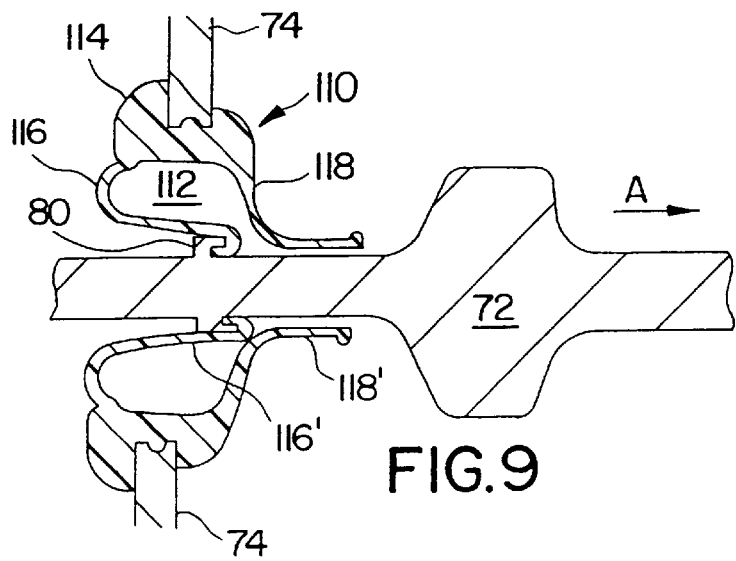
FIGS. 9 to 11 illustrate the process of the present invention employing a novel mold of the present invention.

As shown in FIG. 9, when the mold has been opened, core 72 is moved in the direction of arrow A. Because of the elastomeric nature of the material from which grommet 110 is made, short tube funnel section 118 flexes outward and allows the bulbous portion of core 72 to pass therethrough. During the movement of core 72, long tube funnel section 116 is pulled into open cavity 112 in the same manner as depicted in FIG. 5. Due to the frictional forces between the end of long term funnel section 116 and L-shaped protrusion 80, long tube funnel section is drawn into cavity 112.

Figure 10:
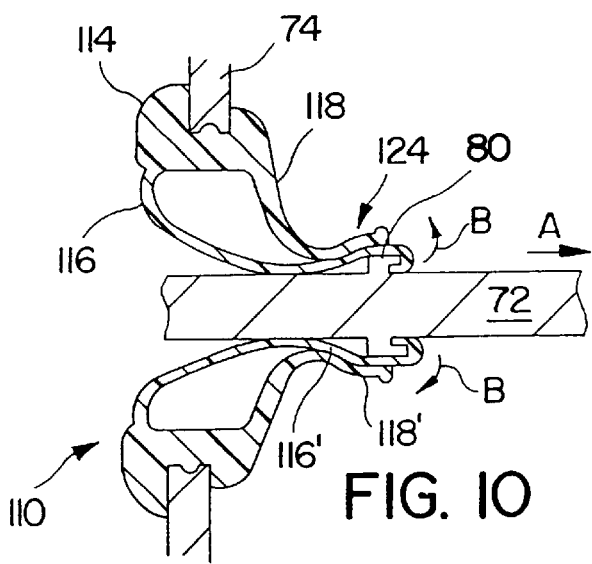

As shown in FIG. 10, the movement of core 72 continues in the direction of arrow A until long tube portion 116' has been inverted into short tube portion 118' and double walled portion 124 is formed. At this point, the portion of long tube funnel section 116 which is hooked under L-shaped protrusion 80 is released as shown by the arrows labeled B in FIG. 10. This action releases the frictional contact between core 72 and grommet 110.

Figure 11:
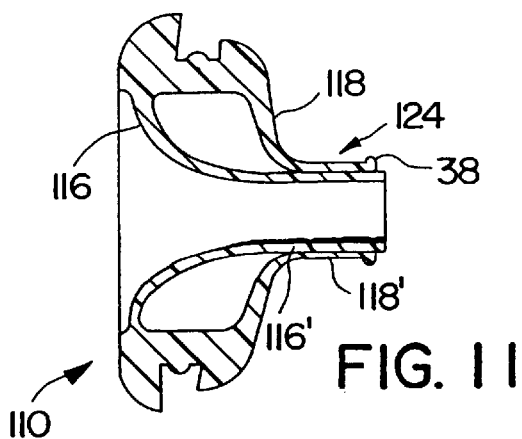

Once the frictional engagement between long tube funnel section 116 and core 72 is released, core 72 continues to be moved in the direction of arrow A in order to completely eliminate the contact between core 72 and grommet 110. At that time, central mold plate 74 is released from grommet 110 and the finished grommet as shown in FIG. 11 remains. As can be seen in FIG. 11, grommet 110 is substantially similar to grommet 15 except that grommet 110 does not have reinforcement 38. It has been found that the absence of reinforcement 38 from grommet 15 does not affect either its soundproofing or waterproofing characteristics.

Figure 12:
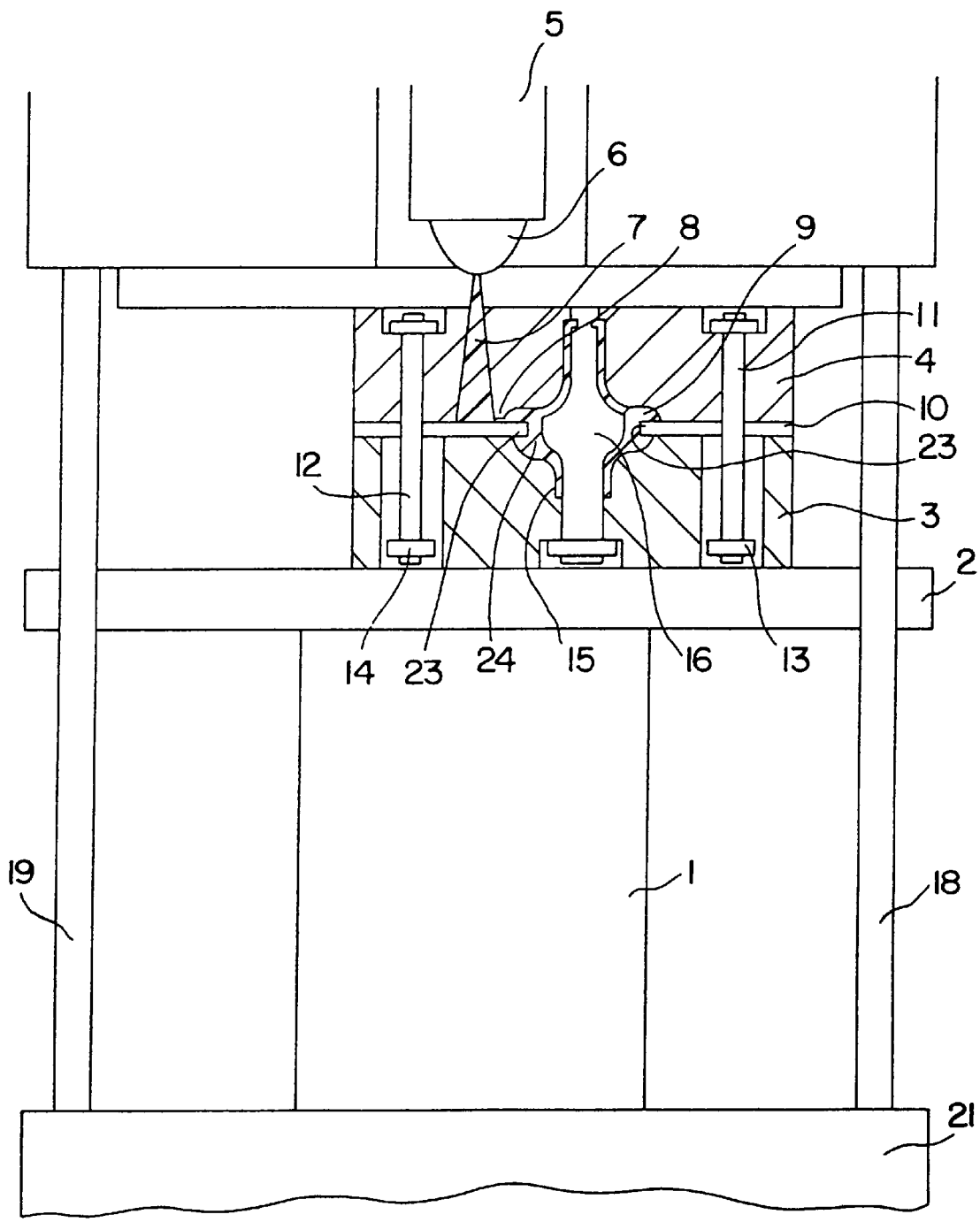
FIG. 12 is an elevation, partly in section, showing the device of the present invention in its closed position.
Figure 13:
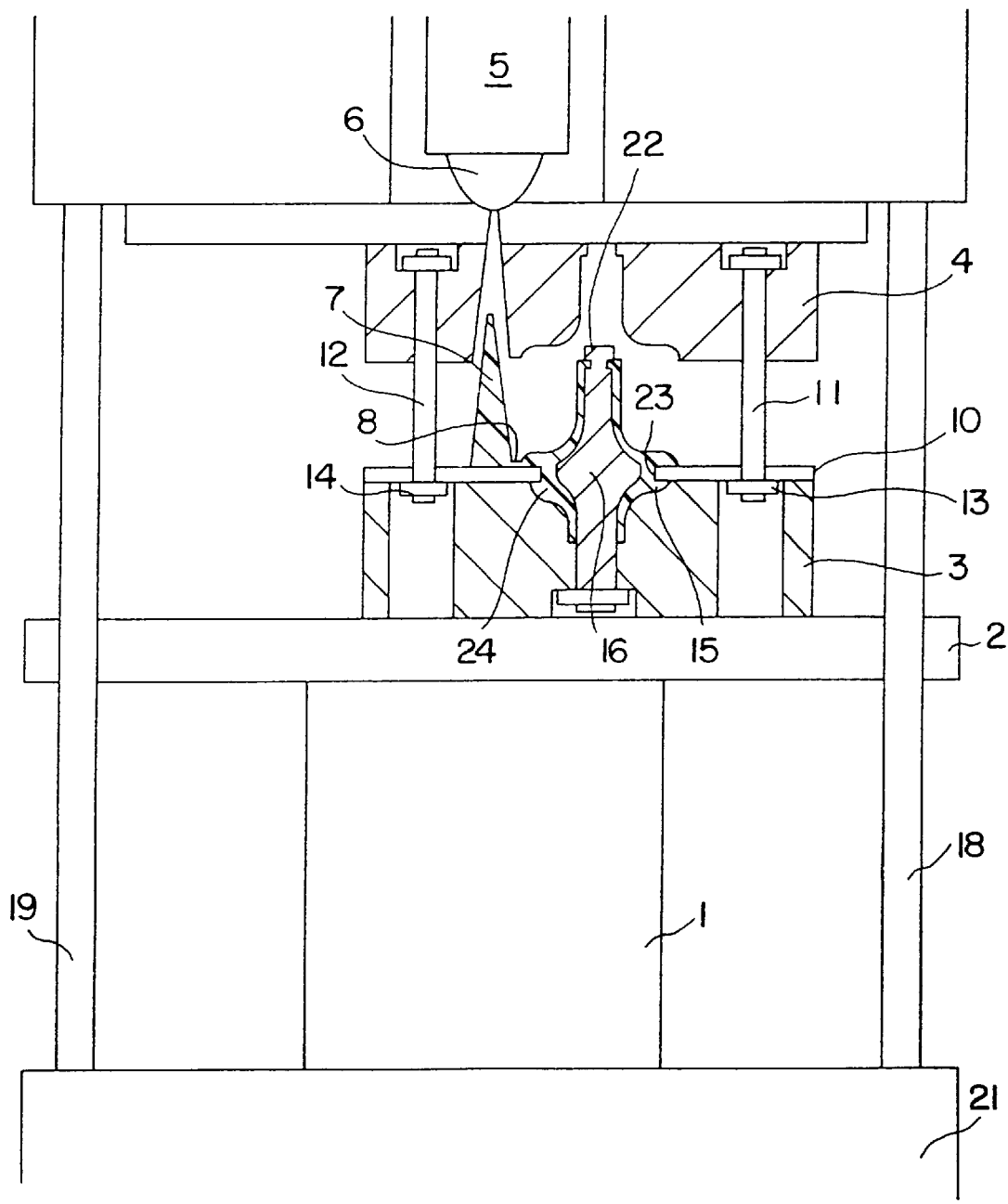
FIG. 13 is a view, similar to that of FIG. 12, with the device in its intermediate position.
Figure 14:
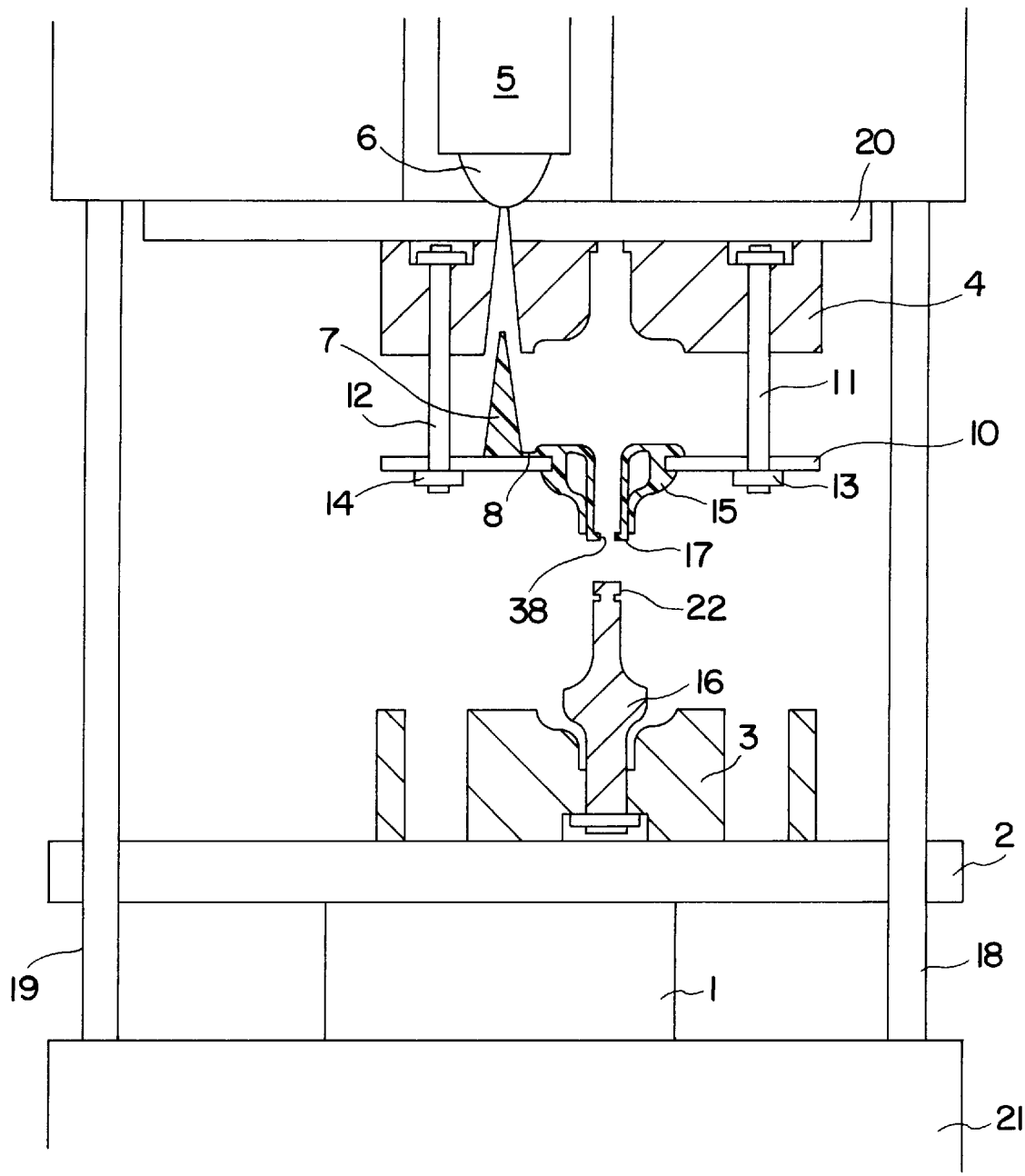
FIG. 14 is a view, similar to that of FIG. 12, with the device in its open position.

As shown in FIGS. 12 to 14, the device for carrying out the method of the present invention comprises base 21, mold clamping cylinder 1, movable plate 2, movable mold 3, and fixed mold 4. The closed position is shown in FIG. 12 and middle plate 10 is located between movable mold 3 and fixed mold 4. Edge 23 projects into the molding space to form the channel in body 24. Injection cylinder 5 introduces the moldable material through nozzle 6, sprue 7, and gate 8 into the molding space 9. Stop members 13 and 14 are provided on the distal ends of guide pins 11 and 12, respectively. Retainer 22 of core 16 is positioned within fixed mold 4. Retainer 22 (in this case a peripheral groove in core 16) receives the complementary radially inwardly extending rib on grommet 15.

As movable plate 2 is moved to its intermediate position, as shown in FIG. 13, grommet 15, along with gate 8 and sprue 7, is detached from fixed mold 4. Since core 16 is affixed to movable mold 3 and movable mold 3 is attached to movable plate 2, all of these elements are separated from fixed mold 4. In FIG. 13, middle plate 10 has reached stop members 13 and 14 at the distal ends of guide pins 11 and 12. These stop members serve to hold middle plate 10 in this position.

FIG. 14 shows the device in its open position. Movable plate 2 has been moved along the bars 18 and 19 to a position further from fixed mold 4 than middle plate 10. The plate is suspended from guide pins 11 and 12 by stop members 13 and 14. Also, retainer 22 has pulled end 17 of grommet 15 into the axial hollow. It then releases the grommet. Due to its resilience, grommet 15 can be removed from edge 23 of middle plate 10. It carries with it sprue 7 and gate 8 which are removed thereafter to form the finished grommet.

Figure 15:
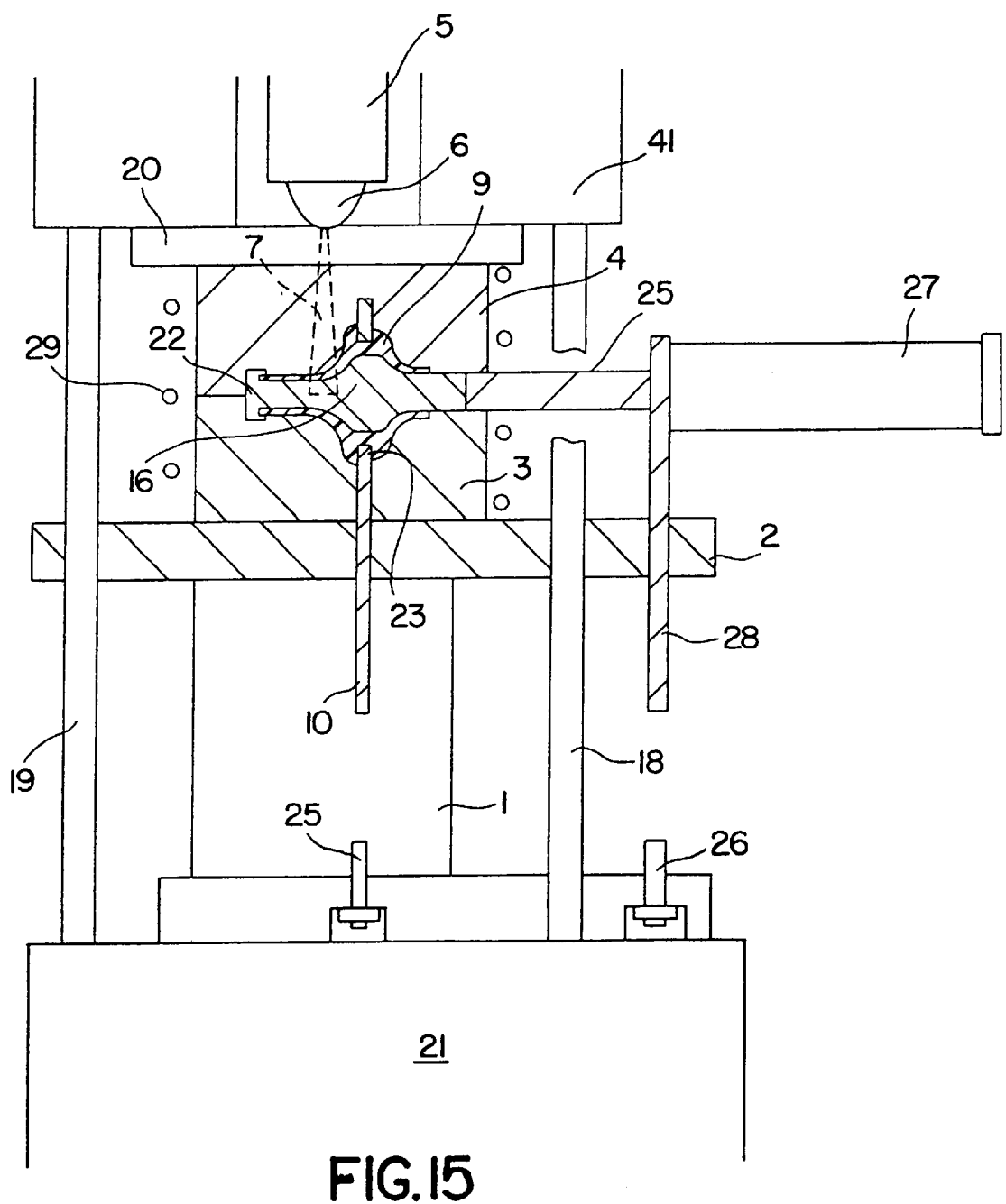
FIG. 15 is a side elevation, partly in section, of the modified device of the present invention in the closed position.
Figure 16:
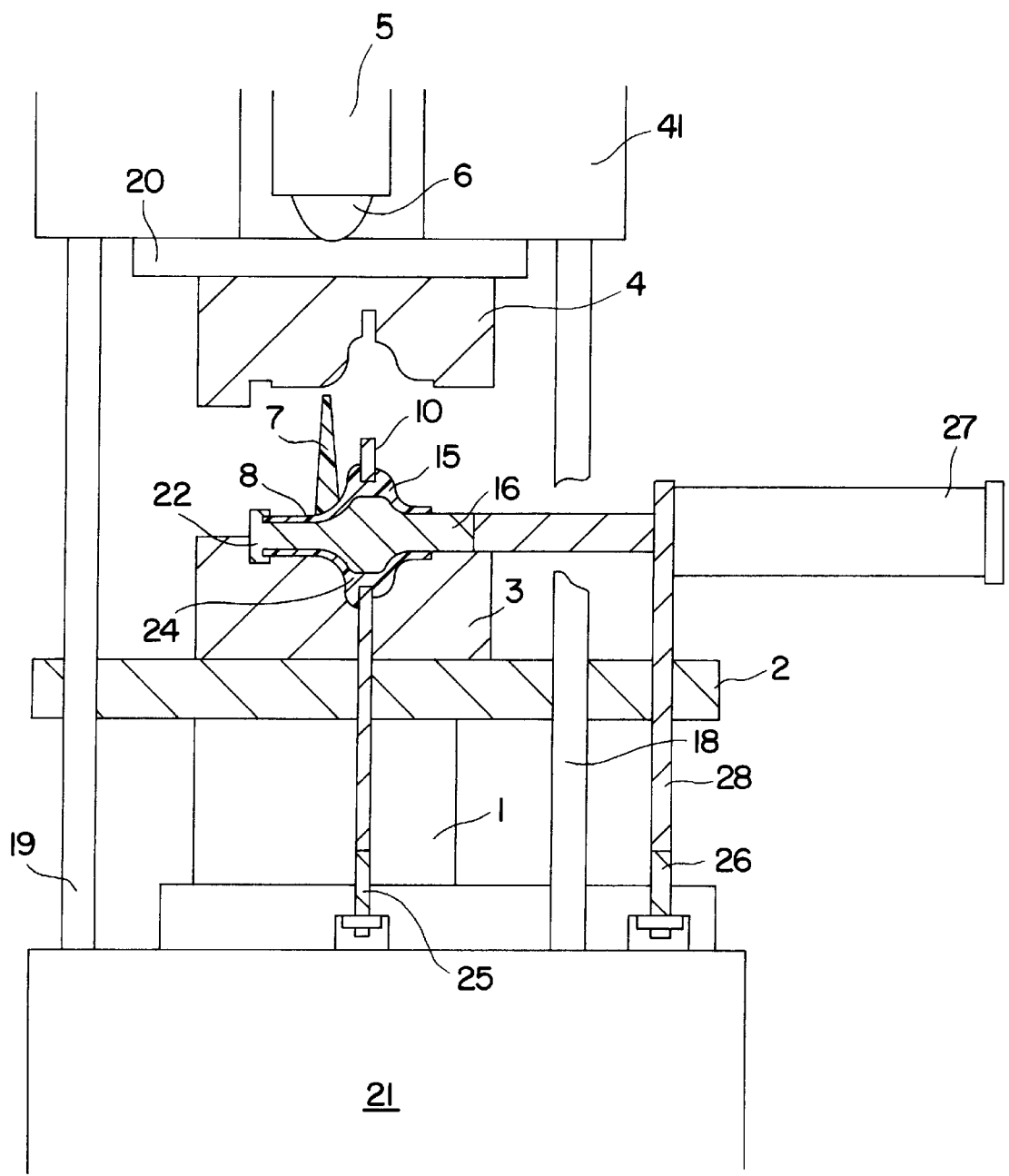
FIG. 16 is a view, similar to that of FIG. 15, with the modified device in the intermediate position.
Figure 17:
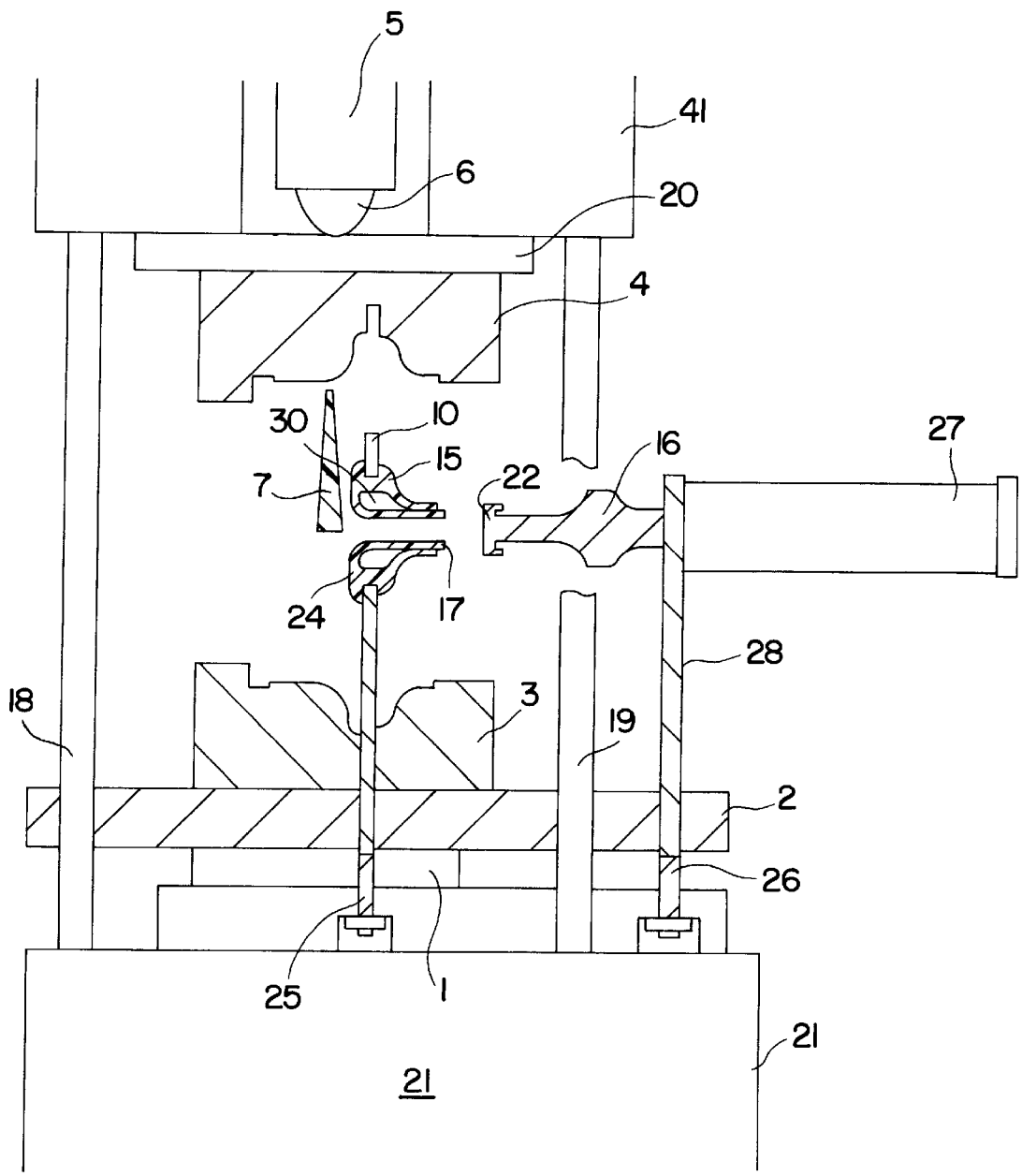
FIG. 17 is a view, similar to that of FIG. 15, with the modified device in the open position.

The modified form of the device is shown in FIGS. 15 to 17. It comprises mold clamping cylinder 1 mounted on base 21. Movable mold 3 is affixed to movable plate 2 and fixed mold 4 is attached to fixed plate 20 which, in turn, is affixed to support 41. In its closed position, as shown in FIG. 15, movable mold 3 is adjacent fixed mold 4, and edge 23 of middle plate 10 and core 16 extend therein, thereby forming molding space 9 for formation of the grommet. Core 16 is mounted on piston 27 which is adapted for movement in the second direction, i.e. horizontally as shown in FIG. 15. The moldable material is introduced by injection cylinder 5 through nozzle 6, sprue 7, and a gate (not shown) into molding space 9. Retainer 22 of core 16 and piston 27 are disposed on opposite sides of middle plate 10.

Movable plate 2, carrying movable molds 3 and middle plate 10, is moved along tie bars 18 and 19 to the intermediate position as shown in FIG. 16. Middle plate 10 and guide 28 rest on stops 25 and 26, respectively, thereby preventing middle plate 10 from further downward movement. At this stage, core 16 remains in the axial hollow 30 of grommet 15 and retainer 22 engages the adjacent end of the grommet.

Movable plate 2, carrying movable mold 3, continues to move in the first direction into the open position as shown in FIG. 17. Since downward movement of plate 10 is prevented by stops 25 and 26, movable mold 3 is now separated completely from grommet 15. Core moving cylinder 27 is activated and core 16 is drawn out of the axial hollow 30 of grommet 15 in a second direction; edge 23 of middle plate 10 holds body 24 and prevents movement of grommet 15. Preferably, the second direction is perpendicular to the first direction. Retainer 22, as core 16 is withdrawn, carries grommet end 17 into the axial hole to the position shown in FIG. 17. At this point, the grommet is removed from plate 10 and sprue 7 and gate 8 are removed and discarded.

In a preferred form of the device, heater 29 is provided adjacent space 9 so that the moldable material can be heat-cured if appropriate. This element has been omitted from FIGS. 12–14, 16 and 17 for clarity.

It will be appreciated by those skilled in the art that modifications can be made to the external mold structure and to the core used in molding the grommet while still employing the method of the present Invention to invert the long tube funnel section into the short tube funnel section. For example, core 16 could terminate at the point where retainer 22 is formed. Thus, long tube funnel section 31 is still maintained in frictional contact with core 16 due to round retainer 22 and is pulled through short tube funnel section 32 (see FIG. 5). Likewise, core 72 could terminate just past L-shaped protrusion 80 so that L-shape protrusion 80 continues to maintain frictional contact with long tube funnel section 116 and long tube funnel section 116 when inverted into short tube funnel section 118 (see FIG. 10).

While only a limited number of specific examples of the present invention have been expressly disclosed, it is, nonetheless, to be broadly construed, and not to be limited except by the character of the claims appended hereto.

What is claimed is:

1. A method of forming a grommet, said grommet comprising a hollow, a body, a long tube funnel section on one side of said body and having a long tube portion, a short tube funnel section on an opposite side of said body and having a short tube portion, and an annular depression on an outer circumference of said body, said method comprising:

a) molding said grommet by introducing an elastomeric material into a molding space of a multi-part closed mold and allowing said elastomeric material to harden, said molding space being defined by a movable core, having a bulbous section corresponding to said hollow, and an external mold structure which includes a movable middle plate, an upper fixed mold, and a movable lower mold, said movable core and said movable lower mold being movable in a direction parallel to a longitudinal axis of said movable core, said movable core having a depression or an L-shaped protrusion at a portion corresponding to a distal end of said long tube funnel section so as to form a retainer;

b) moving said movable lower mold, said movable core, said movable middle plate, and said grommet together in said direction to an intermediate position, leaving said movable core, said movable lower mold, and said movable middle plate in contact with said grommet such that said grommet is disengaged from said fixed upper mold;

c) stopping said moving of said movable middle plate at said intermediate position and continuing said moving of said movable core and said movable lower mold in said direction to an open position whereby said movable middle plate holds said grommet in place while said movable core passes therethrough and said bulbous portion causes said short tube funnel section to flex outward to allow said bulbous Portion to pass therethrough as said movable core and said lower mold is moved to said open position, thereby inverting said long tube funnel section into said short tube funnel section to form a double walled portion;

d) releasing said retainer from said movable core and said grommet from said movable core and said lower mold during said moving of said movable core and said movable lower mold to said open position; and e) releasing said grommet from said movable middle plate.

2. A method of forming a grommet, said grommet comprising a hollow, a body, a long tube funnel section on one side of said body and having a long tube portion, a short tube funnel section on an opposite side of said body and having a short tube portion, and an annular depression on an outer circumference of said body, said method comprising:

a) molding said grommet by introducing an elastomeric material into a molding space of a multi-part closed mold and allowing said elastomeric material to harden, said molding space being defined by a movable core, having a bulbous section corresponding to said hollow, and an external mold structure which includes a movable middle plate, an upper fixed mold, and a movable lower mold, said movable core and said movable lower mold being movable in a first direction perpendicular to a longitudinal axis of said movable core, said movable core having a depression or an L-shaped protrusion at a portion corresponding to a distal end of said long tube funnel section so as to form a retainer;

b) moving said movable lower mold, said movable core, said movable middle plate, and said grommet together in said first direction to an intermediate position, leaving said movable core, said movable lower mold, and said movable middle plate in contact with said grommet such that said grommet is disengaged from said fixed upper mold;

c) stopping said moving of said movable middle plate and said movable core at said intermediate position and continuing said moving of said movable lower mold in said first direction to an open position such that said grommet is disengaged from said movable lower mold;

d) moving said movable core in a second direction parallel to the longitudinal axis of said movable core and perpendicular to said first direction whereby said movable middle plate holds said grommet in place while said movable core passes therethrough and said bulbous portion causes said short tube funnel section to flex outward to allow said bulbous portion to pass therethrough as said movable core is moved in said second direction, thereby inverting said long tube funnel section into said short tube funnel section to form a double walled portion;

e) releasing said retainer from said movable core and said grommet from said movable core during said moving of said movable core in said second direction; and f) releasing said grommet from said movable middle plate.

* * * * *